United States Patent [19]
Hyer

[11] Patent Number: 5,524,796
[45] Date of Patent: Jun. 11, 1996

[54] SCREW FEEDER WITH MULTIPLE CONCENTRIC FLIGHTS

[75] Inventor: Frank S. Hyer, Duxbury, Mass.

[73] Assignee: Hyer Industries, Inc., Pembroke, Mass.

[21] Appl. No.: 295,456

[22] Filed: Aug. 24, 1994

[51] Int. Cl.⁶ .................................................. G01F 11/20
[52] U.S. Cl. .......................... 222/241; 222/413; 198/662; 198/669
[58] Field of Search ............................ 222/77, 238, 239, 222/240, 241, 333, 413; 241/260.1; 198/662, 659, 669

[56] References Cited

U.S. PATENT DOCUMENTS

| | | | |
|---|---|---|---|
| 2,641,369 | 6/1953 | Mulcey et al. | 214/21 |
| 2,954,261 | 9/1960 | Taupin | 302/50 |
| 3,047,034 | 7/1962 | Sassmannshausen | 141/411 |
| 3,186,602 | 6/1965 | Ricciardi | 222/161 |
| 3,381,801 | 5/1968 | Rastoin | 198/213 |
| 3,439,836 | 4/1969 | Ricciardi | 222/240 |
| 3,704,076 | 11/1972 | Bodunov | 415/72 |
| 3,710,983 | 1/1973 | Ricciardi | 222/141 |
| 3,726,392 | 4/1973 | Rastoin | 198/659 |
| 3,822,809 | 7/1974 | Foucault | 222/71 |
| 4,057,225 | 11/1977 | Ferree | 366/157 |
| 4,444,509 | 4/1984 | Steiner et al. | 366/157 |
| 4,739,907 | 4/1988 | Gallant | 222/240 |
| 4,872,546 | 10/1989 | Hindermann | 198/662 X |

FOREIGN PATENT DOCUMENTS

| | | | |
|---|---|---|---|
| 805985 | 2/1969 | Canada | 198/659 |
| 2316167 | 1/1977 | France | B65G 69/18 |
| 1112384 | 8/1961 | Germany. | |
| 4104190 | 8/1992 | Germany | B65G 47/16 |
| 753073 | 7/1956 | United Kingdom | 78/1 |
| 855270 | 11/1960 | United Kingdom | 78/1 |
| 2060421 | 5/1981 | United Kingdom. | |

OTHER PUBLICATIONS

"How to test your gravimetric feeder's performance," Powder and Bulk Engineering, Dec. 1993 (5 pp.).
"Metalfab Volumetric Feeder Model DB1, Winner of 1978 John C. Vaaler Award," brochure (3 pp.).
"PF–18 Loss of Weight Powder Feeder," Thayer Scale–Hyer Industries, Inc. brochure (4 pp.) Jan. 1993.

Primary Examiner—Gregory L. Huson
Attorney, Agent, or Firm—Lahive & Cockfield

[57] ABSTRACT

A compound screw feeder for uniform volumetric flow rates of particulate solids, suitable for low, nonpulsating feed rates, comprises coaxial inner and outer screw flights. The flights both extend throughout the feeder section and produce a net discharge flow rate dependent on their respective feed directions and rates of feed. Various forms of the feeder may be employed in a loss of weight screw feeder system.

14 Claims, 4 Drawing Sheets

SCREW FEEDER WITH MULTIPLE CONCENTRIC FLIGHTS

BRIEF SUMMARY OF THE INVENTION

This invention relates generally to feeders for delivering particulate solid material in granular or pulverulent form by weight or volume at an accurately controlled rate. More particularly, the invention relates to screw feeders capable of delivery of the material at uniform, low flow rates.

Screw feeders of this general type comprise a chamber for receiving and holding a quantity of the material and having a trough at the bottom, a feed tube aligned with the trough and communicating with one end thereof through an inlet opening, and a feed screw extending along the trough through the inlet opening of the feed tube to the discharge end of the tube.

Chambers in common use may be of the "V" trough type having sloping side walls joined at the bottom by a trough section conforming to a predetermined radius, or the "U" trough type having an upper section with walls tapering to an elongate aperture and a U-shaped trough section joined to the walls at the aperture, and conforming to a radius at the bottom.

It is common practice to provide easily detachable feed tubes and feed screws and to provide a number of interchangeable feed screws of different diameters and carrying capacities, thus permitting the assembly to handle an extended range of feed rates.

Difficulties with screw feeders in present use are encountered in attempting to obtain accurate feed rates, i.e. rates that remain within a predetermined percent of a set value, and in attempting to obtain repeatable feed rates, i.e. rates that remain within a predetermined percent of a given rate consistently over time. The difficulties are caused by conditions arising both within the feed tube and within the chamber.

With a typical single flight screw discharging vertically through an opening in the bottom of the feed tube, pulsations of material flow occur because each time the screw flight crosses the edge of the opening the material is temporarily restricted.

Within the chamber, a major additional cause of nonuniform flow rates is failure of the material to fill the entire volumetric space defined by the screw flights, thus causing variable void spaces to move along the feed tube. This can result from any of several factors. For example, the material may form bridges or arches over the feed screw in the trough, thus preventing the screw from filling in a uniform manner. Also, the material may fall from the feed screw into regions of the trough below the feed screw, or it may lodge and become packed in the end of the trough where stagnation corners may exist in the vicinity of the inlet opening into the feed tube. Such packed material also necessitates periodic and often difficult cleaning of the chamber between material runs.

The foregoing factors can have varying effects depending on the diameter of the feed screw selected for use in the feeder. This is commonly critical at low feed rates. If a screw feeder is designed for a small diameter feed screw having minimal clearance with the trough in the chamber, the arching span over the feed screw is small and promotes the formation of material bridges. If a screw feeder is designed for use with multiple interchangeable feed screws, variations in uniformity and accuracy of feeding arise because of the differences between the different screw radii and the radius of the trough, the latter being fixed for a given feeder.

With a view to overcoming the foregoing problems of intermittent, pulsating, nonuniform flow, particularly at low rates of feed, a principal feature of this invention comprises a compound feed screw having coaxial inner and outer screw flights. These flights extend throughout the feed tube, and both flights provide partial contributions to the net discharge rate from the feeder.

Each of the flights tends to produce a feed rate and direction of feeding that are functions of a number of parameters including its diameter, effective surface area, pitch, pitch hand and direction of rotation. The net material flow rate is the result of the flow contributions of both flights as they coact within the confinement of the feed tube.

The invention permits a number of alterative embodiments. For example, either flight may feed material in the forward direction, i.e. toward the discharge end of the feed tube, or in the reverse direction. Both flights may feed material in the forward direction, in which case the flights may have different individual feed rates. Either flight may have the greater feed rate, although the flight having the greater individual feed rate is the outer flight in most cases. In many applications the flights tend to feed in opposite directions and thus have a differential action.

Important advantages of the invention are realized in applications employing multiple interchangeable compound feed screws having differing net feed rates. Since the rate of feed of each flight is dependent on the above mentioned parameters additional to its outer diameter, and since the net flow rate of the feeder is dependent on the action of both flights, it is possible to design all of the interchangeable feed screws for a given feeder to have the same outer diameter while having differing net feed rates. A single feed tube can then be used with all of the feed screws. Moreover, this common outer diameter can be conformed to the trough radius within the chamber so as to eliminate stagnation corners, to prevent material within the flights from falling into space below the feed screw, and to provide a self-cleaning feature by avoiding the accumulation of packed material in the bottom of the chamber.

In embodiments of the invention employing differential feed action, i.e. inner and outer flights with opposite feed directions, the outer diameter of the feed screw is greater than that of a conventional single flight feed screw having the same feed rate. As a result, the material is less likely to form bridges or arches over the feed screw, as compared with a conventional single flight feed screw.

By using an improved screw feeder according to this invention, it is possible to construct a loss of weight screw feeder combining the desirable features of highly uniform and accurate feed rates, interchangeability of feed screws without the sacrifice of uniformity and accuracy of feed rate, and the capability of operation at very low feed rates without the sacrifice of uniformity and accuracy of feed rates.

Other features of the invention comprise alternative options in design that are made possible by the plural concentric flight configuration, as hereinafter described.

DETAILED DESCRIPTION

Figure 1:
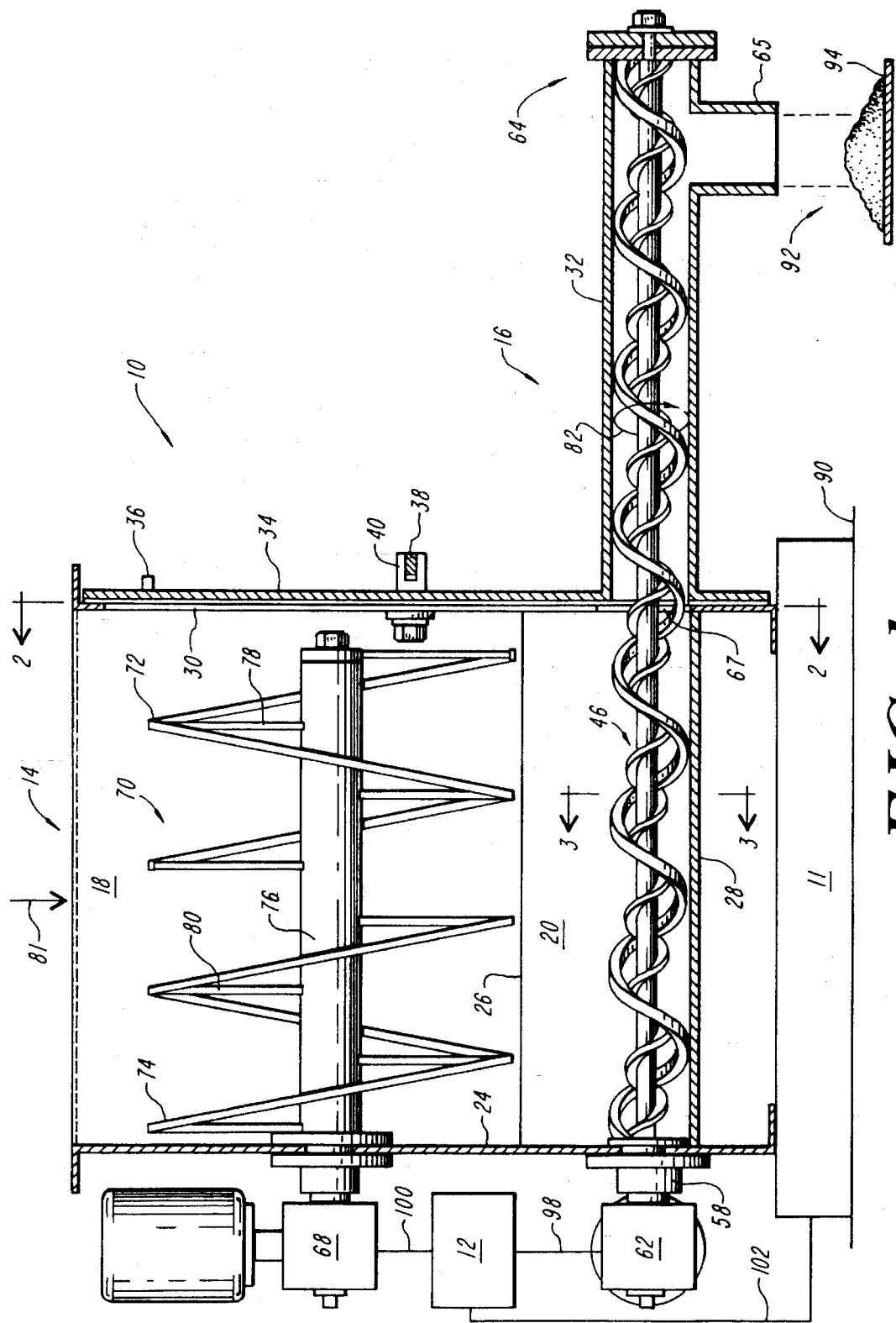
FIG. 1 is a side elevation partially in section of a presently preferred embodiment of a loss of weight screw feeder system incorporating the invention.

Referring to FIGS. 1 to 5, a presently preferred embodiment of loss of weight screw feeder system incorporating the invention comprises a screw feeder depicted generally at 10, a weigh scale 11 and a control unit 12. The screw feeder 10 comprises a chamber 14 and a feeder 16. The chamber comprises an upper section 18 and a trough 20. The upper section is formed by elongate downwardly and inwardly sloping side walls 22, preferably permanently attached to a back wall 24 of rectangular dimensions and forming a closure for one end thereof. The side walls 22 converge downwardly to a lengthwise aperture 26.

In this embodiment the chamber is the "U" trough type. The trough 20 is formed by a member 28 having a bottom 29 (FIG. 2) conforming to a half cylinder and an upper portion connecting with the side walls 22 to form the aperture 26. The member 28 has a U-shaped cross section.

An end plate 30 preferably has rectangular outer dimensions corresponding to those of the back wall 24, and an opening 31 shaped in its lower extremity to conform to the end edge of the member 28, the plate 30 being permanently attached to that edge.

The feeder 16 comprises a cylindrical feed tube 32 fitted in a circular hole in a from wall 34 and secured thereto by welding or bolting. When assembled on the chamber 14, the feed tube 32 is coaxial with the half cylindrical bottom of the trough 20. The front wall covers the opening 31 and completes the front end enclosure of the chamber. The feeder is mounted on the chamber by a pair of pins 36 attached to and projecting from the plate 30 and passing through matching holes 37 in the wall 34. The wall 34 is timely held against the plate 30 by a locking bar 38 swiveled on a hinge pin 40 attached to the plate 30. In use, the locking bar is pivoted to bear against the front wall 34 and fastened by a suitable latch 42 to a pin 44 attached to the plate.

A feed screw generally designated at 46 (FIG. 4) has a compound construction comprising a shaft 48 extending coaxially with the half cylinder bottom of the member 28, a helical inner flight 50 in the form of a blade with a radially extending surface integral with and extending from the shaft, and a helical outer flight 52 supported on and coaxially with the inner flight 50. In this embodiment the flights 50 and 52 are of opposite pitch hand, thus having a differential action in use.

The flight 52 is of open form and is preferably made of wire stock of uniform square, round or rectangular cross section, formed as an open helix and supported by uniformly axially distributed struts 54 (FIG. 5) attached to and extending from the outer peripheral edges of the inner flight 50. The struts 54 are omitted from FIGS. 1, 3 and 4 for clarity of illustration. If desired, they may be omitted from the structure and the flight 52 may be supported directly on the outer periphery of the flight 50, or it may be supported only by attachment to the shaft at each end. An axially extending space 56 is defined between the flights, this space being the entire open space within the outer diameter of the outer flight 52 extending throughout the feed tube 32 and the length of the trough 20.

A minimum non-binding clearance is provided between the outer diameter of the outer flight 52 and the inner surface of the feed tube. This is required to confine the material being conveyed by the feed screw and thus to enable the feeder to deliver the material at an accurately adjusted and controlled feed rate. For purposes of this description, this clearance is called the "feeder clearance." Also, the difference between the outer radius of the outer flight 52 and the radius of the half cylinder bottom 29 of the trough 20 equals the same minimum non-binding "feeder clearance." The magnitude of this clearance is a function of the properties of the material being fed, particularly the maximum particle size.

Figure 4:
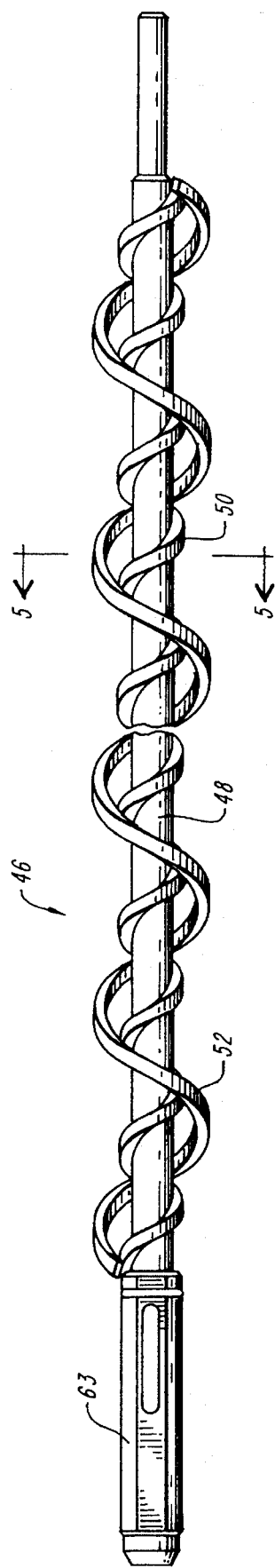
FIG. 4 is a longitudinal elevation of the feed screw of FIGS. 1–3.
Figure 5:
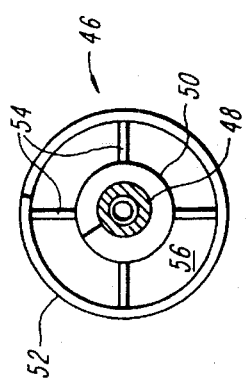
FIG. 5 is an elevation in section taken on line 5—5 of FIG. 4.

A bearing housing 58 (FIG. 1) is attached to the back wall 24. A drive socket (not shown) extends from the housing through the wall 24 and is rotatably driven by a motor and transmission unit 62. The drive socket is adapted for detachably and drivingly receiving an end 63 of the feed screw having hexagonal flats (FIG. 4).

A suitable bearing 64 is provided at an end of the cylinder 32 to support the opposite end of the feed screw. Alternatively, if the feed tube 32 is relatively short and the feed screw is sufficiently supported by the bearing housing 58 and drive socket, the bearing 64 may be omitted.

Near the end of the feed screw the feed tube is provided with a discharge opening formed by a short transverse extension 65.

Thus the feeder 16 comprises a quickly detachable sub-assembly including the feed tube 32, the from wall 34 and the feed screw 46. When it is assembled to the chamber 14, the hexagonal end 63 of the screw shaft 48 fits into the drive socket extending from the bearing housing 58, and the feed screw 46 is coaxial with the half cylinder bottom of the member 28. An inlet opening 67 (FIG. 1) is formed at the end of the feed tube and comprises the material feed entrance into the feeder 16.

Figure 2:
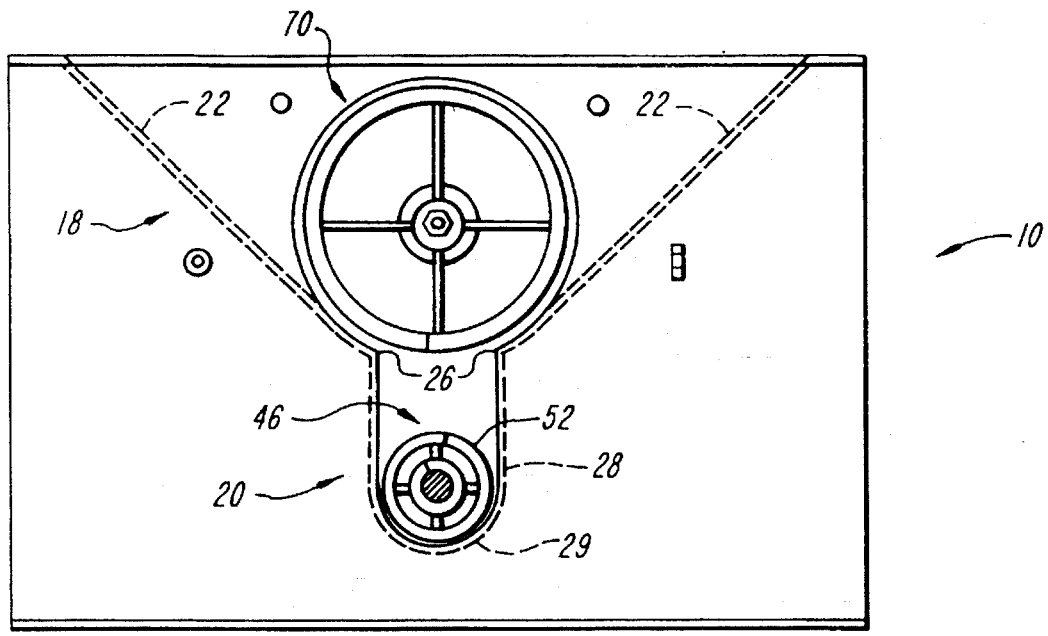
FIG. 2 is a front elevation in section of the feeder taken on line 2—2 of FIG. 1.

The back wall 24 rotatably supports a cantilevered shaft 66 projecting inwardly into the upper section 18 from a motor and transmission unit 68 (FIG. 1). An agitator 70 of conventional construction comprises a pair of helical shaped blades 72 and 74. The blades are supported by a sleeve 76 keyed to and rotatable with the shaft 66, and by a plurality of radially extending spokes 78 and 80, respectively. The spokes are attached to and project from the sleeve 76. Each of the blades 72 and 74 extends approximately half the longitudinal extent of the chamber, and they are of opposite pitch hand or winding sense, whereby during rotation the blade 72 moves material away from the front wall 34 toward the center of the chamber and the blade 74 moves material from the back wall 24 toward the center of the chamber. Preferably, the blades 72 and 74 extend radially from the sleeve 76 as close as practicable to the aperture 26 as shown in FIG. 2.

In operation, particulate solids such as powders or granular material are loaded into the top of the chamber 18 as depicted by an arrow 81, or the upper section 18 can be bolted to the bottom of a hopper of larger holding capacity. Loading is continuous or repeated, typically from a hopper provided with a discharge gate, to keep a quantity of material in the upper section 18 as it is depleted by action of the feed screw 46. The agitator 70 and the feed screw 46 are preferably independently driven by the respective units 62 and 68, and means are provided for independently varying their speeds. The agitator rotates and conditions the material in the upper section 18, breaking arches or bridges that may tend to form across the aperture 26 and, thus facilitating the uniform flow of material into the trough 20 through the aperture 26.

The flights 50 and 52 have a differential action. In this embodiment the outer flight 52 is driven in the direction of the arrow 82 (FIG. 1) to propel material toward the discharge opening at the extension 65, and flight 50 being of opposite pitch hand tends to move material in the reverse direction. Alternatively, the inner flight can be driven in the direction to propel material toward the discharge opening with the outer flight driven in the opposite direction. In any case, the parameters are selected so that the flight which propels the material toward the discharge opening has a larger material carrying capacity than the other flight.

The above described compound or multiple flight construction of the feed screw 46 provides improved conditions for the complete filling of the space 56 within the outer diameter of the outer flight 52, particularly at the inlet opening 67 where the material enters and becomes confined in the feed tube 32. This improvement results in part from the fact that the diameter of the outer flight greatly exceeds the diameter of a conventional single flight feed screw of comparable flow capacity in order to compensate for the opposing action of the inner flight. As a consequence, the width of the aperture 26 and the corresponding diameter of the inlet opening 67 into the feeder greatly exceed the corresponding dimensions in a conventional screw feeder. Bridging or arching is prevented because the length of an arch spanning the aperture 26 is correspondingly greater.

The improvement also results in part from the fact that there is only a minimum "feeder clearance" between the screw 46 and the bottom 29 of the trough, and this applies to feed screws of all feed capacities including the lowest where interchangeability of screws is provided for. This feature prevents material which falls into the space 56 from escaping to a space in the trough below the feed screw. Also, since space below the feed screw in the trough is eliminated, there is no "stagnation corner" where material can accumulate and become packed. The apparatus is therefore self-cleaning, and time and effort previously required for periodically cleaning out packed material is saved.

Figure 6:
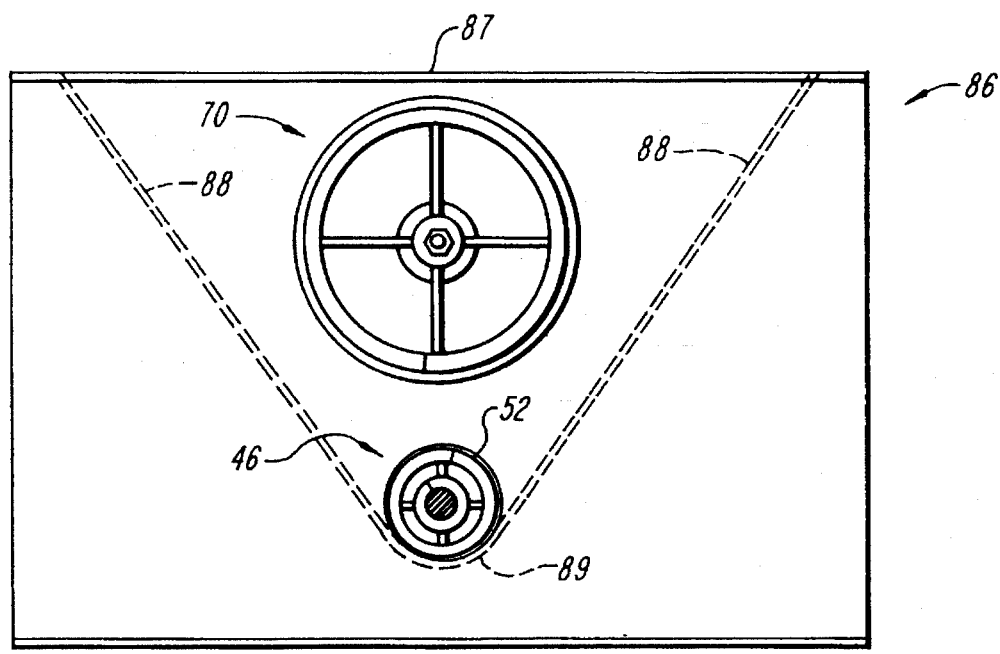
FIG. 6 is a front elevation in section similar to FIG. 2, showing a second embodiment of screw feeder according to the invention.
Figure 3:
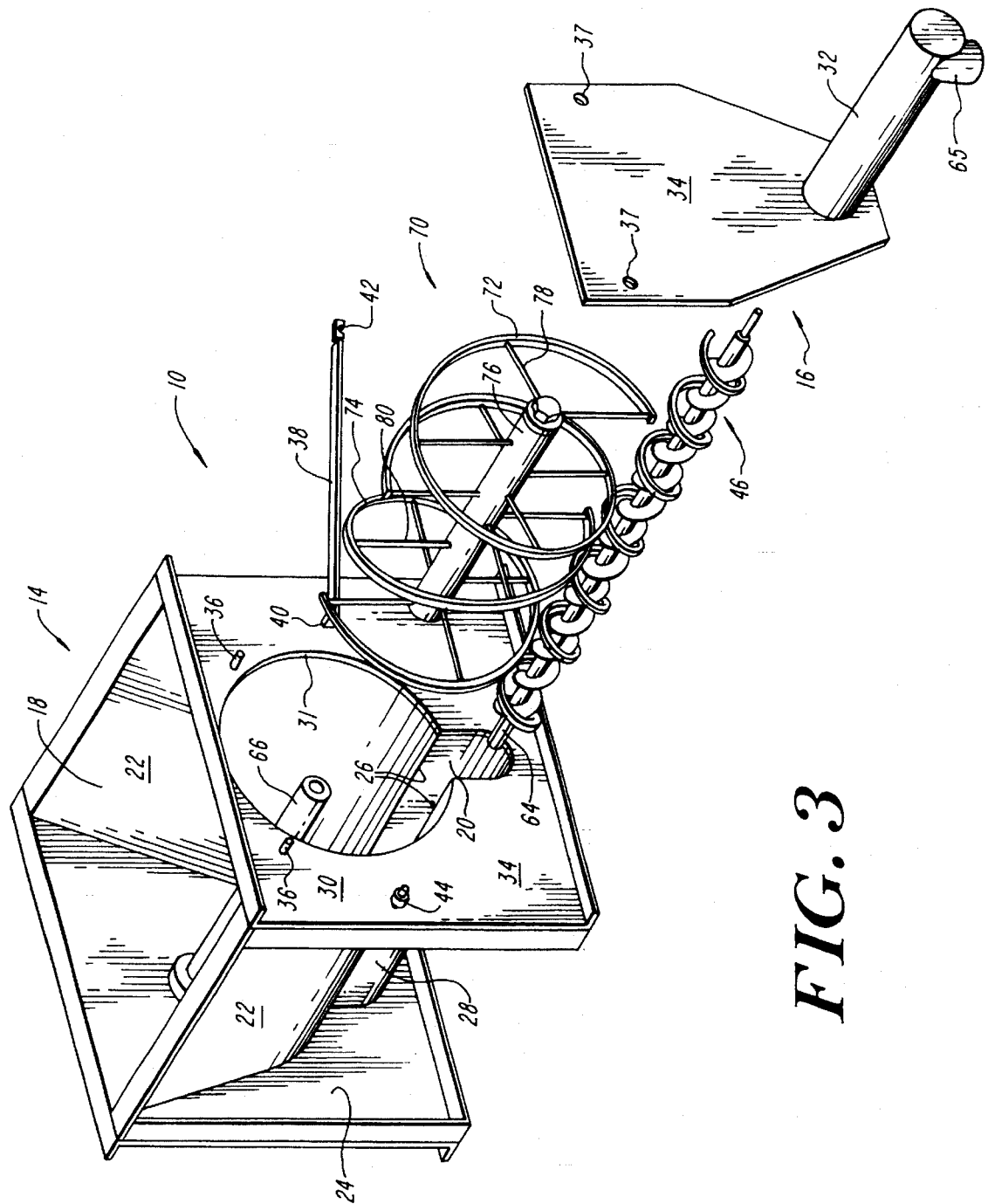
FIG. 3 is an exploded diagonal view of the presently preferred embodiment of the screw feeder of FIGS. 1 and 2.

FIG. 6 illustrates a second embodiment of the invention which comprises a screw feeder of the V-trough type, depicted generally at 86, including the feed screw 46 previously described. This embodiment comprises a chamber 87 differing from the chamber 14 of FIGS. 1 to 3 in that it is not provided with a separate trough similar to the trough 20 of FIGS. 1 and 2. In cross section on a plane transverse to the material feed direction, walls 88 form a V-shape as shown, with a bottom portion 89 forming a cylindrical trough sector having a radius exceeding the outer radius of the outer flight 52 by the above defined "feeder clearance." A feeder (not shown) is constructed substantially like the feeder 16 of FIGS. 1 and 2 and is mounted coaxially with the axis defining this cylindrical sector. The agitator 70 of FIGS. 1 and 2 may be used in this embodiment, as shown.

It will be apparent to those skilled in the art that other embodiments of the invention can be provided for a variety of specific applications. For example, the flights 50 and 52 have been illustrated as being of opposite pitch hand, thus causing differential action and radial components of material movement within the axially extending space 56 (FIG. 5) between the flights. Embodiments may also be provided having inner and outer flights mounted on the same shaft and being of the same pitch hand. In that case, the flights have an additive effect on the material flow, and a similar radial component of material movement is produced if the rates of material delivery of the flights are different.

In still other alternative embodiments, the inner flight may be designed to have a greater material feed capacity than the outer flight. In that case the direction of rotation is appropriate to turn the inner flight in the desired direction of material flow.

The specific configurations of the inner and outer flights can each be chosen from a variety of screw designs familiar to those skilled in the art. These may be of the open helix type as illustrated by the outer flight 52, or the closed helix type as illustrated by the inner flight 50. The inner and outer flights may both be of the open helix form. Any of the flights of open helix form may be supported by radial struts or may be supported only by end attachments to the shaft, depending on the requirement for adequate rigidity. Also, when the length of the feed screw 46 is sufficiently short it may consist only of open inner and outer flights both joined to the drive socket on the bearing housing 58, the shaft 48 being entirely eliminated. In that case, the necessary rigidity is provided by the flights alone.

Embodiments having a substantial range of applications can also be constructed by providing concentric inner and outer flights that are independently driven. The separate drives, or either of them, can have variable speeds and may be reversible, whereby either only one or both of the inner and outer flights may be driven to propel material in the forward feed direction.

The present invention provides significant advantages for both "U" trough and "V" trough forms of chambers. Preferably, only the minimum "feeder clearance" is provided between the outer radius of the outer flight 52 and the bottom 29 of the trough 20 (FIG. 2) or the bottom portion 89 (FIG. 6). This eliminates any space in the trough below the feed screw into which the material can fall, and also any so-called "stagnation corner" in the vicinity of the inlet opening 67, in which the material can become packed.

Moreover, this minimum "feeder clearance" can be the same for all interchangeable feed screws for a given feeder. This is accomplished by designing the outer diameters of the outer flights of all feed screws to be the same, and varying the other parameters of both flights to produce the different feed rates desired. This provides a distinct advantage for feed screws having low feed rates because the differential action of the inner and outer flights permits the use of a large diameter outer flight. This results in a larger arching span over the feed screw, thus avoiding the frequent bridging of the material that occurs with small single flight feed screws.

It has also been observed that when the compound feed screw of this invention is employed, pulsations in the feed rate at the discharge opening of the extension 65 are greatly reduced or eliminated at all rotational speeds of the feed screw including the lowest speeds in most feeder applications. This results from the net effect of the different partial contributions of the inner and outer flights to the net rate of feed at all instantaneous angles of the respective flights relative to the discharge opening.

FIG. 1 illustrates a loss of weight screw feeder system that may utilize either the illustrated feeder 10 or any of the other feeder embodiments described above. In the embodiment shown the feeder 10 is supported upon the weigh scale 11. The scale 11 is mounted on a fixed support 90. Material is discharged at 92 upon a moving conveyor belt 94. Alternatively, the material could be discharged into any other desired receptacle.

The embodiment shown has a closed loop loss-of-weight feeder control of conventional form. The control unit energizes the motors 62 and 68 over lines 98 and 100, respectively, and includes a speed control to vary the speed of the motor 62 to a value corresponding to a manually adjustable set rate of material feed onto the belt 94. The weight on the scale modulates a weight signal on a line 102 leading to the control unit 12. The control unit 12 computes the time derivative of the weight signal and compares it with the set value. The control 12 is adapted for automatically increasing or decreasing the speed of the motor 62 during operation by increments proportional to any difference detected between the computed time derivative and the set rate. The speed of the motor 68 may be fixed or may be varied in like manner as the motor 62.

The above-described material feeding system may also be employed with an open loop control in which the speed of the motor 62 is simply varied to increase or decrease the volume or weight rate of material flow onto the belt 94 as desired.

I claim:

1. A screw feeder for particulate solids having, in combination, a chamber having an end wall and wall portions extending downwardly and terminating laterally at said end wall, a cylindrical feed tube external to the chamber and communicating therewith through an opening in said end wall, the feed tube extending from said end wall to a discharge opening, feed screw means comprising coaxial helical inner and outer flights of differing outer diameters, each flight extending from within the chamber through said opening and the feed tube to the discharge opening, the outer flight being confined by the feed tube with a minimum nonbinding clearance, and means to rotate the flights in directions whereby one flight feeds the solids in the direction from the chamber toward the discharge opening and the other flight tends to feed the solids in the opposite direction.

2. A screw feeder according to claim 1, in which the discharge opening is located in a wall of the feed tube.

3. A screw feeder according to claim 1, in which the flights are independently driven.

4. A screw feeder according to claim 1, in which the flights have differing individual material feed rates.

5. A screw feeder according to claim 4, in which the outer flight feeds the solids in the direction toward the discharge opening.

6. A screw feeder according to claim 1, in which the flights are of opposite pitch hand and are attached together.

7. A screw feeder according to claim 6, in which the feed screw means include a shaft and the inner and outer flights are fixed to the shaft.

8. A screw feeder according to claim 1, in which the outer flight comprises an open band of helical shape.

9. A screw feeder according to claim 8, in which the band is attached to the inner flight by struts to form an axially extending space between the flights.

10. A screw feeder according to claim 1, including a scale supporting the chamber and feeder and responsive to the loss of weight of material from the discharge opening.

11. A screw feeder according to claim 10, including a closed loop control adapted to sense the rate of change of the weight on said scale, and operatively connected to said means to rotate the flights in response to said rate.

12. A screw feeder for particulate solids having, in combination, a chamber having an end wall and wall portions extending downwardly to a trough, the lower portion of the trough conforming to a cylindrical sector, said trough terminating at said end wall, a cylindrical feed tube external to the chamber, having substantially the same inside diameter as said sector and being coaxial therewith, the trough and one end of the feed tube communicating through an opening in the end wall, the feed tube extending from said end wall to a discharge opening, feed screw means comprising coaxial helical inner and outer flights of differing outer diameters, each flight extending from within the trough through said opening and the feed tube to the discharge opening, the outer flight being confined by the feed tube with a minimum nonbinding clearance, and means to rotate the flights in directions whereby one flight feeds the solids in the direction from the chamber toward the discharge opening and the other flight tends to feed the solids in the opposite direction.

13. A screw feeder according to claim 12, in which said wall portions slope tangentially to said cylindrical sector to form a V-shaped trough.

14. A screw feeder according to claim 12, in which the chamber comprises a U-shaped trough and a wall sloping to the sides of the trough to form an elongate aperture over the feed screw.

\* \* \* \* \*